United States Patent
DeChiaro (10) Patent No.: US 9,891,983 B1
(45) Date of Patent: Feb. 13, 2018

(54) CORRELATING ANOMALIES IN OPERATIONAL METRICS WITH SOFTWARE DEPLOYMENTS

(71) Applicant: Microsoft Technology Licensing, LLC, Redmond, WA (US)

(72) Inventor: Anthony DeChiaro, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 6 days.

(21) Appl. No.: 15/223,502

(22) Filed: Jul. 29, 2016

(51) Int. Cl.
*G06F 11/00* (2006.01)
*G06F 11/07* (2006.01)
*G06F 9/445* (2006.01)

(52) U.S. Cl.
CPC ........... *G06F 11/079* (2013.01); *G06F 8/60* (2013.01); *G06F 11/0709* (2013.01); *G06F 11/0751* (2013.01); *G06F 11/0772* (2013.01)

(58) Field of Classification Search
CPC ............ G06F 11/1008; G06F 11/079; G06F 11/3409; G06F 11/3452
USPC ................................................ 714/37, 25, 2
See application file for complete search history.

(56) References Cited

U.S. PATENT DOCUMENTS

| | | | | |
|---|---|---|---|---|
| 9,250,784 | B2 * | 2/2016 | Adams | G06F 3/0486 |
| 2015/0127995 | A1 * | 5/2015 | Kripalani | G06F 11/3409 |
| | | | | 714/47.1 |
| 2016/0307125 | A1 * | 10/2016 | Visnovec | G06Q 10/067 |
| 2017/0235622 | A1 * | 8/2017 | Boyapalle | G06F 11/079 |
| | | | | 714/47.2 |

* cited by examiner

*Primary Examiner* — Sarai E Butler
(74) *Attorney, Agent, or Firm* — Schwegman Lundberg & Woessner, P.A.

(57) ABSTRACT

A machine may be configured to determine correlations between anomalies in operational metrics and software deployments. For example, the machine, based on an anomaly pertaining to the running of the service, accesses an operational metric associated with a service running on a social networking service (SNS). The machine generates, based on a log file associated with a software deployment, a deployment time series of completion percentage values indicating levels of completion of the software deployment. The machine determines that a correlation exists between the operational metric and the deployment time series of completion percentage values, and generates a correlation strength identifier based on a determination of a strength of the correlation. The correlation strength identifier indicates a likelihood that the software deployment has caused the anomaly. The machine causes a presentation of the correlation strength identifier in a user interface of a client device.

20 Claims, 9 Drawing Sheets

CORRELATING ANOMALIES IN OPERATIONAL METRICS WITH SOFTWARE DEPLOYMENTS

TECHNICAL FIELD

The present application relates generally to systems, methods, and computer program products for correlating anomalies in operational metrics with software deployments.

BACKGROUND

Sometime, organizations that have an online presence are confronted with online service outages or slower online services. An example of an online service may be the providing of a member profile of a member of a Social Networking Service to a user interface of a client device in response to a request for the member profile. The online service outages may be caused by a variety of factors, such as equipment failure, increased data traffic, or software deployment problems. Often, engineers spend numerous hours manually troubleshooting problems that occur during the delivery of online services.

BRIEF DESCRIPTION OF THE DRAWINGS

Some embodiments are illustrated by way of example and not limitation in the figures of the accompanying drawings, in which.

DETAILED DESCRIPTION

Example methods and systems for correlating anomalies in operational metrics with software deployments are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

In some example embodiments, an anomaly correlation system is configured to identify an anomaly in operational metrics (e.g., an increase in errors, an increase in latency, etc.) and, if such a condition is detected, determine what has caused the anomaly. In some instances, the anomaly may be caused by a recent software deployment. A software deployment may include a change to a software application, such as a software installation or a new version upgrade of a particular software application.

The anomaly correlation system may analyze data pertaining to one or more software deployments and data pertaining to various operational metrics to determine whether there is a correlation between one or more anomalies (e.g., a pattern) in the operational metrics and a particular software deployment. A strong correlation may indicate that the particular software deployment has caused the occurrence of the one or more anomalies.

According to some example embodiments, the anomaly correlation system accesses an operational metric associated with a service running on a social networking service (SNS), such as LinkedIn®. The service may pertain to providing member profile data of one or more members of the SNS to a client device associated with a user in response to one or more requests for the member profile data. The accessing of the operational metric may be based on a detection of an anomaly pertaining to the running of the service. In some instances, the operational metric associated with the service measures one or more types of errors that occur during the running of the service. In certain instances, the operational metric associated with the service measures latency pertaining to the running of the service.

The anomaly correlation system may detect that the anomaly pertaining to the running of the service has occurred during a period of the running of the service. The anomaly correlation system may determine that a software deployment has been performed during a period of time when the anomaly pertaining to the running of the service has occurred (e.g., during the same hour that the anomaly has occurred). In some example embodiments, the software deployment pertains to a software associated with the service. For example, the service pertains to the providing of member profile data of one or more members of the SNS to a client device in response to one or more requests for the member profile data. An example software associated with the service may be code that identifies a particular member profile based on the request for member profile data that is received from the client device. Another example software associated with the service may be code that accesses and retrieves member profile data from a record of a database based on the request for member profile data that is received from the client device.

The anomaly correlation system generates, based on a log file that is associated with a software deployment on the SNS, a deployment time series of completion percentage values. The completion percentage values indicate levels of completion of the software deployment at one or more times in the time series. The anomaly correlation system, in some instances, accesses the log file based on determining that one or more software deployments have occurred during the time window associated with the execution (e.g., running) of the service. The log file may include data pertaining to the completion percentage values of various software deployments during a period of time (e.g., last hour, last twenty-four hours, last week, last month, etc.). For example, the log file may state, for a particular software deployment, "at 13:05, deployment starts; at 13:10, deployment is 15% complete; . . . at 13:50, deployment is 100% complete."

The anomaly correlation system automatically determines that a correlation exists between the operational metric and the deployment time series of completion percentage values. The anomaly correlation system generates a correlation strength identifier based on a determination of a strength of the correlation between the operational metric and the deployment time series of completion percentage values. The correlation strength identifier indicates a likelihood that the software deployment has caused the anomaly. In some instances, the correlation strength identifier is a number between 0.00 and 1.00. The anomaly correlation system causes a presentation of the correlation strength identifier in a user interface of a client device. The presentation of the correlation strength identifier may also include a reference to an identifier of the operational metric, an identifier of the particular software deployment, or both.

In various example embodiments, the operational metric includes a metric time series of data points pertaining to the operational metric. For example, the operational metric consists of a time series that includes data points that correspond to one or more errors that occurred at various times of a time period (e.g., a time window or segment, such as an hour, a day, a week, etc.). The anomaly correlation system, as part of the automatic determining that the correlation exists between the operational metric and the deployment time series of completion percentage values, compares the metric time series of data points pertaining to the operational metric and the deployment time series of completion percentage values indicating levels of completion of the software deployment, and identifies the correlation between the metric time series of data points pertaining to the operational metric and the deployment time series of completion percentage values based on the comparison. The output of the correlation task may be a number indicating the strength of the correlation between the operational metric and deployment time series, wherein a higher value indicates a stronger likelihood that the anomaly in the operational metric is caused by the software deployment.

In certain example embodiments, the operational metric includes a metric time series of data points pertaining to the operational metric. The anomaly correlation system generates a first graph pertaining to the operational metric based on the metric time series of data points pertaining to the operational metric. The anomaly correlation system also generates, based on the deployment time series of completion percentage values, a second graph pertaining to tracking a progress of the software deployment on the SNS. The anomaly correlation system, as part of the automatic determining that the correlation exists between the operational metric and the deployment time series of completion percentage values, compares the first graph and the second graph, and identifies the correlation between the first graph and the second graph. In some example embodiments, the comparing of the first graph and the second graph includes overlaying the first graph and the second graph in the user interface of the client device, and the identifying of the correlation between the first graph and the second graph includes identifying, for a period of time pertaining to the running of the service, a similarity between a first pattern of the first graph and a second pattern of the second graph.

The implementation of the anomaly correlation system has many benefits. The automatic determination of the correlation between an anomaly in an operational metric and a software deployment allows for a significant scaling up of the amount of data that can be analyzed. In some instances, the anomaly correlation system automatically notifies system administrators and operators that a recent software deployment is likely to be faulty or otherwise causing problems with the infrastructure, potentially putting it at risk of failing to respond to user requests. In some example embodiments, based on the anomaly correlation system determining which software deployment causes anomalies in operational metrics, the software deployment may be automatically rolled back to the previous version helping to "heal" the environment without direct operator involvement.

According to some example embodiments, one or more of the methodologies discussed herein may obviate a need for additional searching for information (e.g., log file searches, metrics data searches, web searches, etc.), which may have the technical effect of reducing computing resources used by one or more devices within the anomaly correlation system, or within systems or databases associated with the anomaly correlation system. Examples of such computing resources include, without limitation, processor cycles, network traffic, memory usage, storage space, and power consumption.

Figure 1:
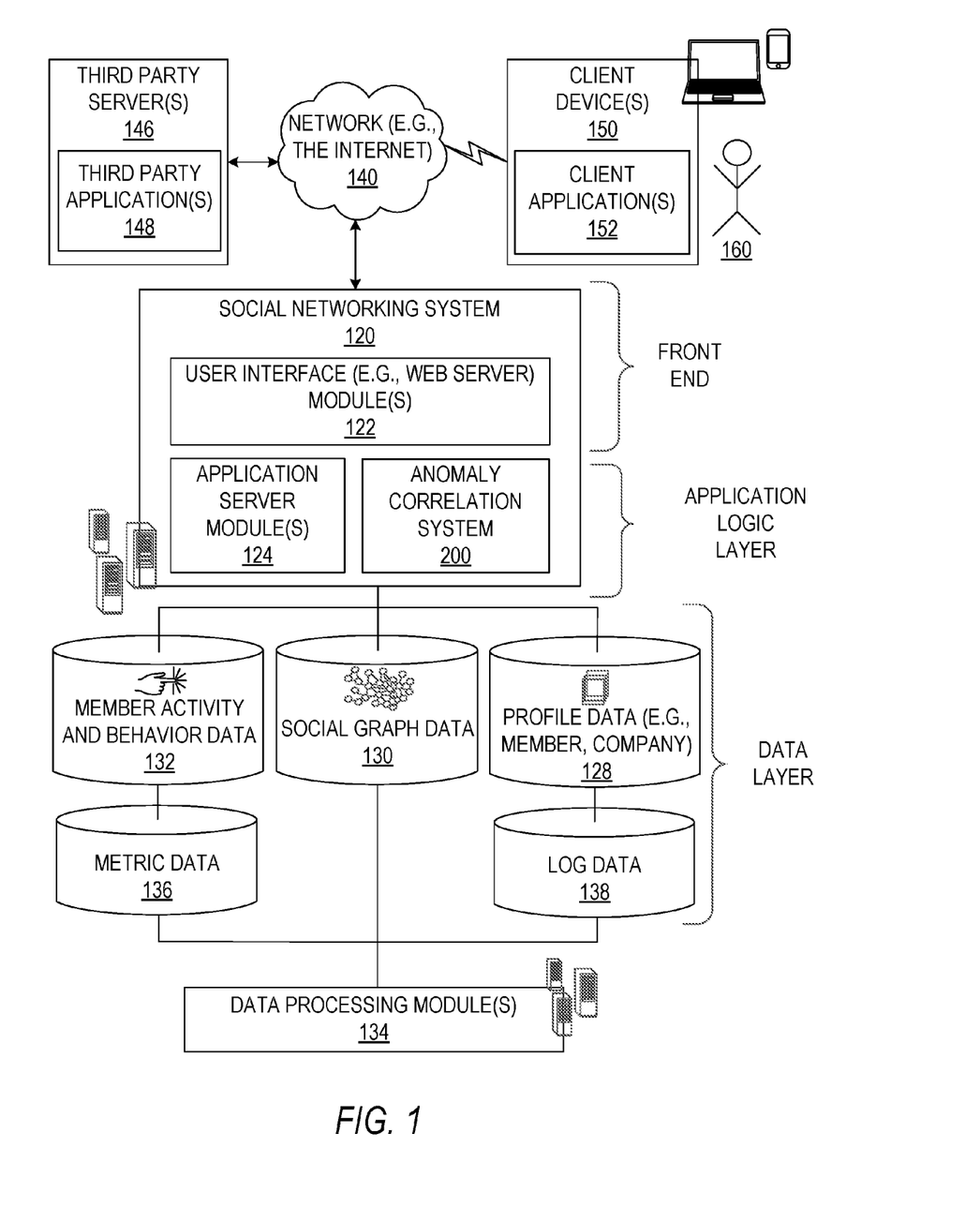
FIG. 1 is a network diagram illustrating a client-server system, according to some example embodiments.

An example method and system for correlating anomalies in operational metrics with software deployments may be implemented in the context of the client-server system illustrated in FIG. 1. As illustrated in FIG. 1, the anomaly correlation system 200 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132. An example of such activity and behavior data is the identifier of an online ad consumption event associated with the member (e.g., an online ad viewed by the member), the date and time when the online ad event took place, an identifier of the creative associated with the online ad consumption event, a campaign identifier of an ad campaign associated with the identifier of the creative, etc.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the SNS may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some example embodiments, members may receive digital communications (e.g., advertising, news, status updates, etc.) targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For example, an ad serving engine showing ads to users may be implemented with one or more application server modules 124. According to another example, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include the anomaly correlation system 200, which is described in more detail below.

Further, as shown in FIG. 1, a data processing module 134 may be used with a variety of applications, services, and features of the social networking system 120. The data processing module 134 may periodically access one or more of the databases 128, 130, 132, 136, or 138, process (e.g., execute batch process jobs to analyze or mine) profile data, social graph data, member activity and behavior data, metric data, or log data, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers, such as Hadoop servers for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
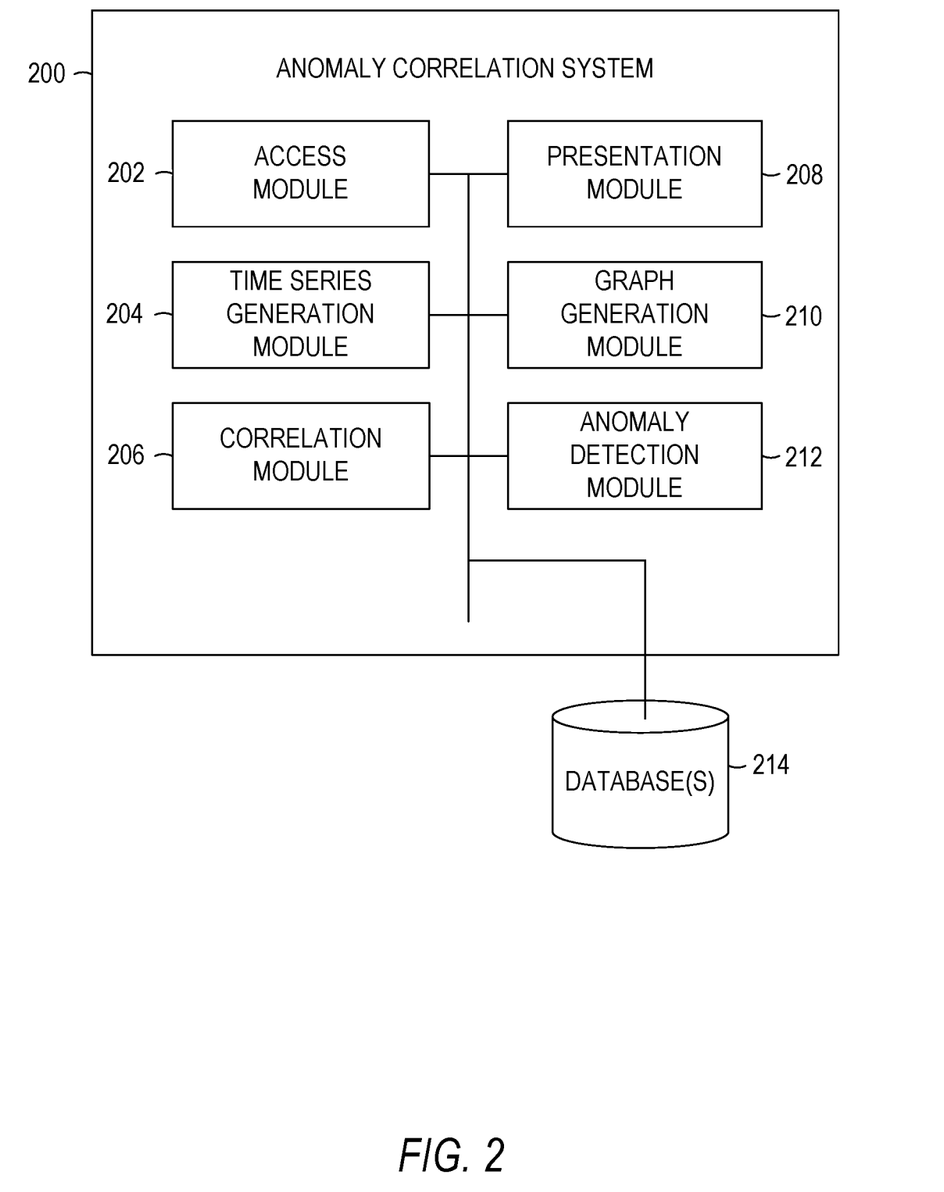
FIG. 2 is a block diagram illustrating components of an anomaly correlation system, according to some example embodiments.

FIG. 2 is a block diagram illustrating components of the anomaly correlation system 200, according to some example embodiments. As shown in FIG. 2, the anomaly correlation system 200 includes an access module 202, a time series generation module 204, a correlation module 206, a presentation module 208, a graph generation module 210, and an anomaly detection module 212, all configured to communicate with each other (e.g., via a bus, shared memory, or a switch).

According to some example embodiments, the access module 202 accesses an operational metric associated with a service running on a social networking service (SNS). The accessing of the operational metric associated with the service may be based on a detection of an anomaly pertaining to the running of the service.

The time series generation module 204 generates a deployment time series of completion percentage values indicating levels of completion of a software deployment at one or more times in the time series. The generating of the deployment time series may be based on a log file that is associated with the software deployment on the SNS.

The correlation module 206 determines that a correlation exists between the operational metric and the deployment time series of completion percentage values. The correlation module 206 may also determine a strength of the correlation between the operational metric and the deployment time series of completion percentage values.

The correlation module 206 also generates a correlation strength identifier based on the determination of the strength of the correlation between the operational metric and the deployment time series of completion percentage values. The correlation strength identifier indicates a likelihood that the software deployment has caused the anomaly. The correlation strength identifier, in some instances, is a number between 0.00 and 1.00.

The presentation module 208 causes a presentation of the correlation strength identifier in a user interface of client device.

In some example embodiments, the operational metric includes (e.g., is) a metric time series of data points pertaining to the operational metric. The graph generation module 210 generates a first graph pertaining to the operational metric based on the metric time series of data points pertaining to the operational metric. The graph generation module 210 also generates a second graph pertaining to tracking a progress of the software deployment on the SNS. The generating of the second graph may be based on the deployment time series of completion percentage values. In some instances, the determining, by the correlation module 206, that the correlation exists between the operational metric and the deployment time series of completion percentage values includes: comparing the first graph and the second graph, and identifying the correlation between the first graph and the second graph. In some example embodiments, the presentation module 208 causes a presentation of the overlaid first and second graphs to graphically indicate the correlation between the operational metric and the software deployment in the user interface of the client device.

The anomaly detection module 212 detects that the anomaly pertaining to the running of the service has occurred during a period of the running of the service.

To perform one or more of its functionalities, the anomaly correlation system 200 may communicate with one or more other systems. For example, an integration system may integrate the anomaly correlation system 200 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 214 (e.g., database 128, 130, 132, 136, or 138).

Figure 3:
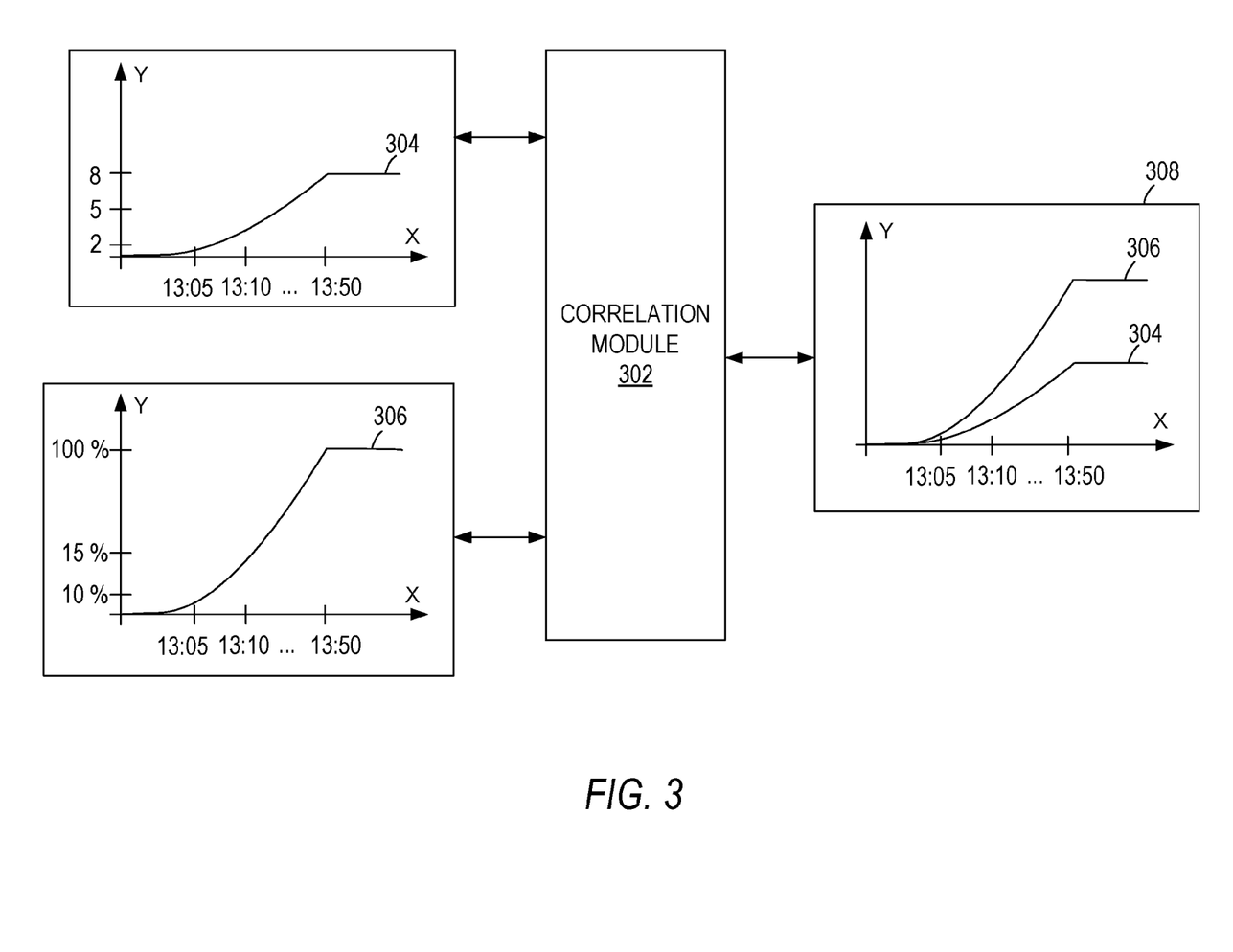
FIG. 3 is an illustration of an example correlation of anomalies in an operational metric with a software deployment, according to some example embodiments.

FIG. 3 is an illustration of an example correlation of anomalies in an operational metric with a software deployment, according to some example embodiments. As shown in FIG. 3, the correlation module 302 of the anomaly correlation system 200 accesses (e.g., receives) as input two graphs: graph 304, which represents an operational metric (e.g., errors), and graph 306, which represents the completion stages of a software deployment. The X axis of both graph 304 and graph 306 identifies a period of time. The Y axis of graph 304 identifies the number of errors at different times of the period of time. The Y axis of graph 306 identifies the completion percentage values of the software deployment at various times of the period of time.

The correlation module 302 may compare graph 304 and graph 306 to determine whether there is a correlation between the operational metric represented by graph 304 and the software deployment whose completion stages are represented by graph 306. In some example embodiments, the correlation module 302 overlays graphs 304 and 306 in the same coordinate plane, as illustrated in item 308 of FIG. 3. The correlation module 302, as part of determining whether a correlation exists between the operational metric and the software deployment, may compare the first graph and the second graph, and may identify the correlation between the first graph and the second graph. For example, the correlation module 302 may determine that during the time period when the particular software was being deployed (e.g., between 13:00 and 13:50), as represented by graph 306, the operational metrics, as represented by graph 304, included an increasing number of errors.

Figure 4:
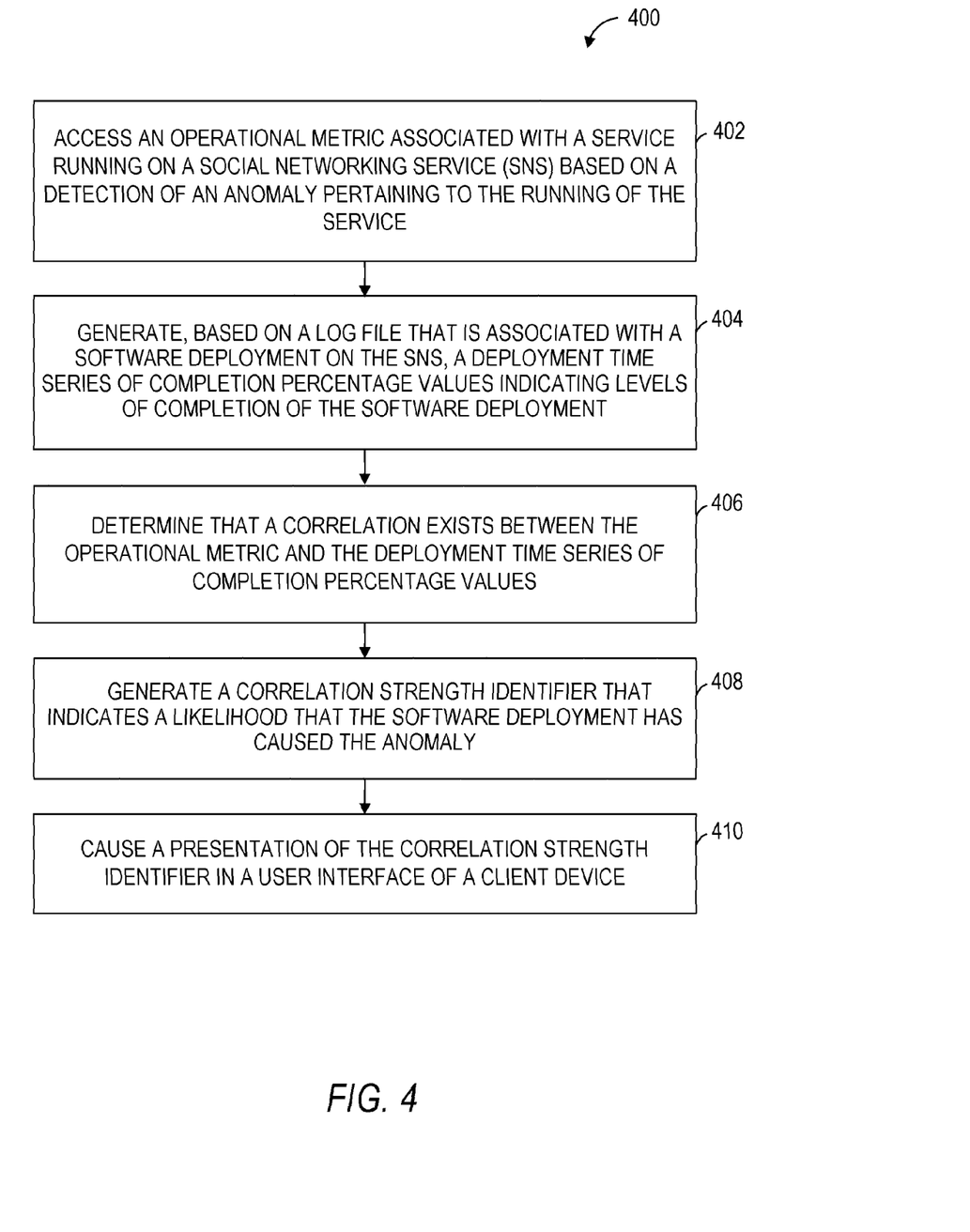
FIG. 4 is a flowchart illustrating a method for correlating anomalies in operational metrics with software deployments, according to some example embodiments.

FIGS. 4-7 are flowcharts illustrating a method for correlating anomalies in operational metrics with software deployments, according to some example embodiments. Operations in the method 400 illustrated in FIG. 4 may be performed using modules described above with respect to FIG. 2. As shown in FIG. 4, method 400 may include one or more of method operations 402, 404, 406, 408, and 410, according to some example embodiments.

At operation 402, the access module 202 accesses an operational metric associated with a service running on the social networking service. The accessing of the operational metric associated with the service may be based on a detection of an anomaly pertaining to the running of the service. In some example embodiments, the operational metric associated with the service measures errors that occur during the running of the service. In various example embodiments, the operational metric associated with the service measures latency pertaining to the running of the service. The service may pertain to providing member profile data in response to one or more requests for member profile data. The requests for member profile data may be received from one or more client devices associated with one or more users (e.g., members of the SNS).

At operation 404, the time series generation module 204 generates a deployment time series of completion percentage values indicating levels of completion of a software deployment at one or more times in the time series. The generating of the deployment time series may be based on a log file that is associated with the software deployment on the SNS.

At operation 406, the correlation module 206 determines that a correlation exists between the operational metric and the deployment time series of completion percentage values.

At operation 408, the correlation module 206 generates a correlation strength identifier based on a determination of a strength of the correlation between the operational metric and the deployment time series of completion percentage values. The correlation strength identifier indicates a likelihood that the software deployment has caused the anomaly.

At operation 410, the presentation module 208 causes a presentation of the correlation strength identifier in a user interface of a client device.

In some example embodiments, the anomaly detection module 212 detects that the anomaly pertaining to the running of the service has occurred during a period of the running of the service. In some instances, the access module 202 accesses the operational metric associated with the service running on the SNS based on the detection of the anomaly during a period of the running of the service.

In various example embodiments, the anomaly detection module 212 determines that the software deployment has been performed during a period of time when the anomaly pertaining to the running of the service has occurred.

In certain example embodiments, the software deployment pertains to a software associated with the service. Further details with respect to the method operations of the method 400 are described below with respect to FIGS. 5-7.

Figure 5:
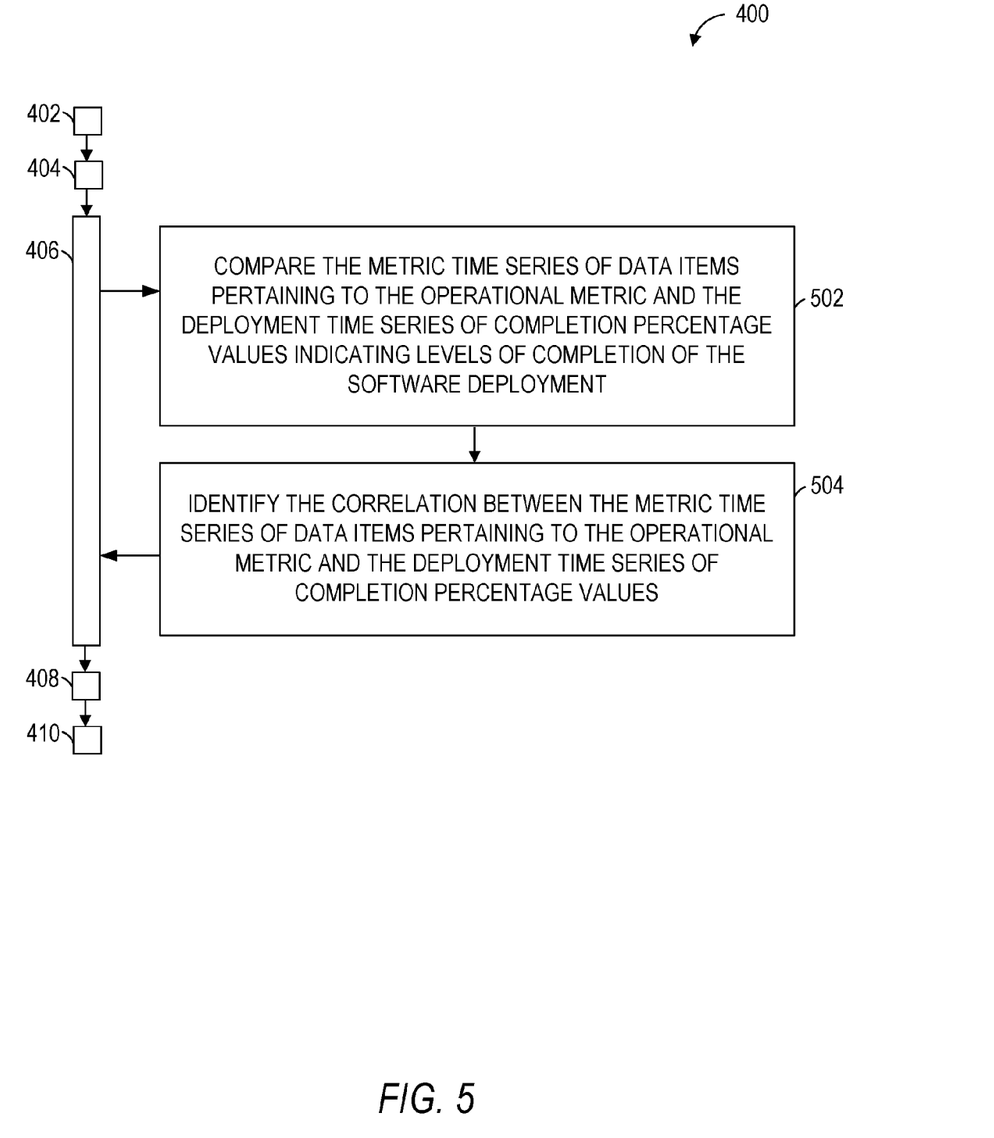
FIG. 5 is a flowchart illustrating a method for correlating anomalies in operational metrics with software deployments, and representing step 406 of the method illustrated in FIG. 4 in more detail, according to some example embodiments.

As shown in FIG. 5, the method 400 may include one or more method operations 502 or 504, according to some example embodiments. Operation 502 may be performed as part (e.g., a precursor task, a subroutine, or a portion) of operation 406 of FIG. 4, in which the correlation module 206 determines that a correlation exists between the operational metric and the deployment time series of completion percentage values.

In some example embodiments, the operational metric includes a metric time series of data points pertaining to the operational metric.

At operation 502, the correlation module 206 compares the metric time series of data points pertaining to the operational metric and the deployment time series of completion percentage values indicating levels of completion of the software deployment.

Operation 504 may be performed as part of operation 406 after operation 502. At operation 504, the correlation module 206 identifies the correlation between the metric time series of data points pertaining to the operational metric and the deployment time series of completion percentage values. In some instances, the correlation is indicated by changes in the metric time series and in the deployment time series that occur during the same period of time.

Figure 6:
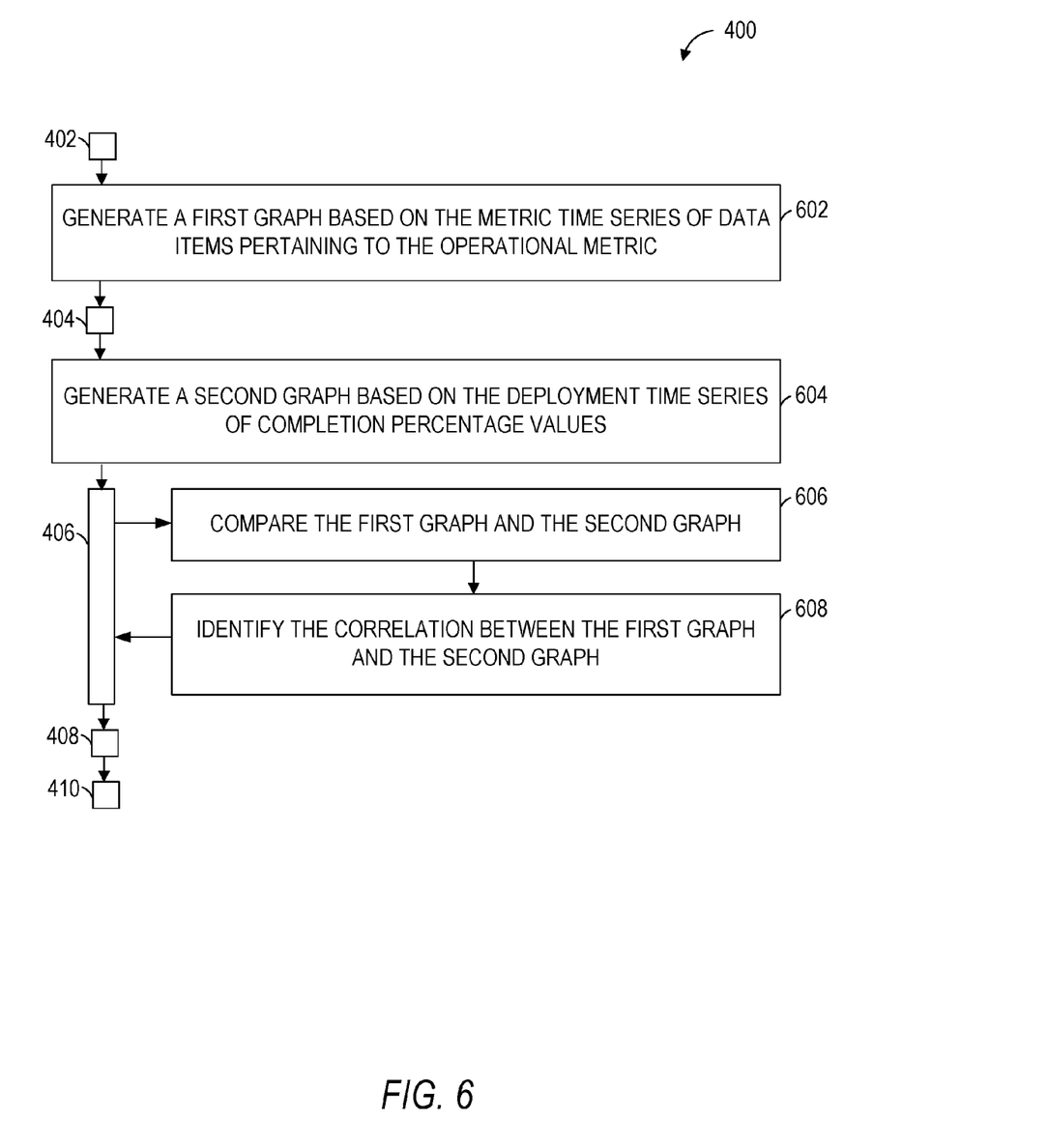
FIG. 6 is a flowchart illustrating a method for correlating anomalies in operational metrics with software deployments, and representing step 406 of the method illustrated in FIG. 4 in more detail, and additional steps of the method illustrated in FIG. 4, according to some example embodiments.

As shown in FIG. 6, the method 400 may include one or more method operations 602, 604, 606, or 608, according to some example embodiments. In some example embodiments, the operational metric includes a metric time series of data points pertaining to the operational metric.

Operation 602 may be performed after operation 402 of FIG. 4, in which the access module 202 accesses an operational metric associated with a service running on the social networking service. At operation 602, the time series generation module 204 generates a first graph pertaining to the operational metric based on the metric time series of data points pertaining to the operational metric.

Operation 604 may be performed after operation 404, in which the time series generation module 204 generates the deployment time series of completion percentage values indicating levels of completion of the software deployment at one or more times in the time series. At operation 604, the time series generation module 204 generates a second graph pertaining to tracking a progress of the software deployment on the SNS. The generating of the second graph may be based on the deployment time series of completion percentage values.

Operation 606 may be performed as part of operation 406, in which the correlation module 206 determines that a correlation exists between the operational metric and the deployment time series of completion percentage values. At operation 606, the correlation module 206 compares the first graph and the second graph.

Operation 608 may be performed as part of operation 406 after operation 404. At operation 608, the correlation module 206 identifies the correlation between the first graph and the second graph.

Figure 7:
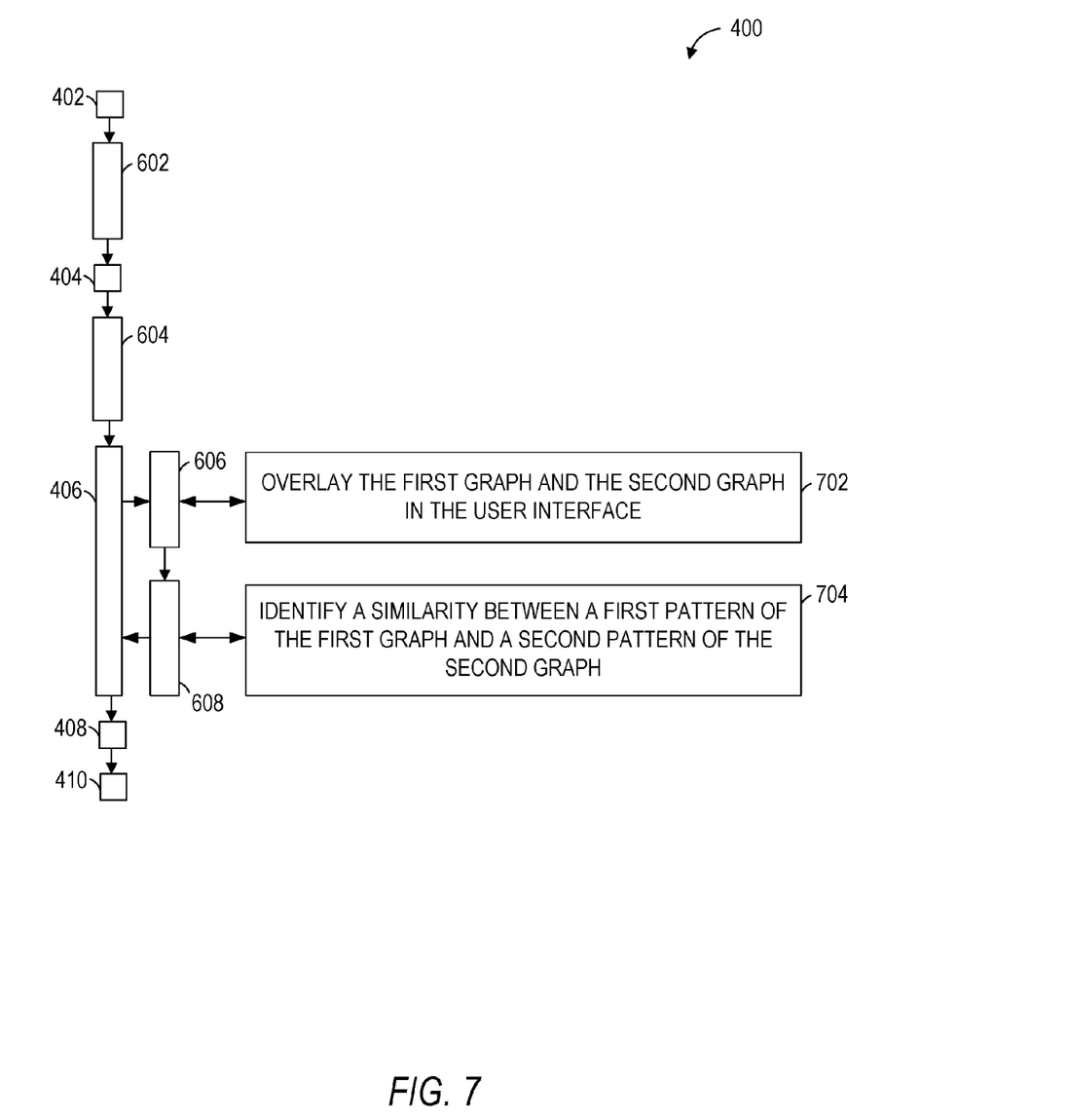
FIG. 7 is a flowchart illustrating a method for correlating anomalies in operational metrics with software deployments, and representing step 406 of the method illustrated in FIG. 6 in more detail, and additional steps of the method illustrated in FIG. 6, according to some example embodiments.

As shown in FIG. 7, the method 400 may include one or more of the method operations 702 or 704, according to some example embodiments. Operation 702 may be performed as part of operation 606 of FIG. 6, in which the correlation module 206 compares the first graph and the second graph. At operation 702, the correlation module 206 overlays the first graph and the second graph in the user interface of the client device.

Operation 704 may be performed as part of operation 608 of FIG. 6 in which the correlation module 206 identifies the correlation between the first graph and the second graph. At operation 704, the correlation module 206 identifies a similarity between a first pattern of the first graph and a second pattern of the second graph based on the overlaying the first graph and the second graph in the user interface of the client device.

Example Mobile Device

Figure 8:
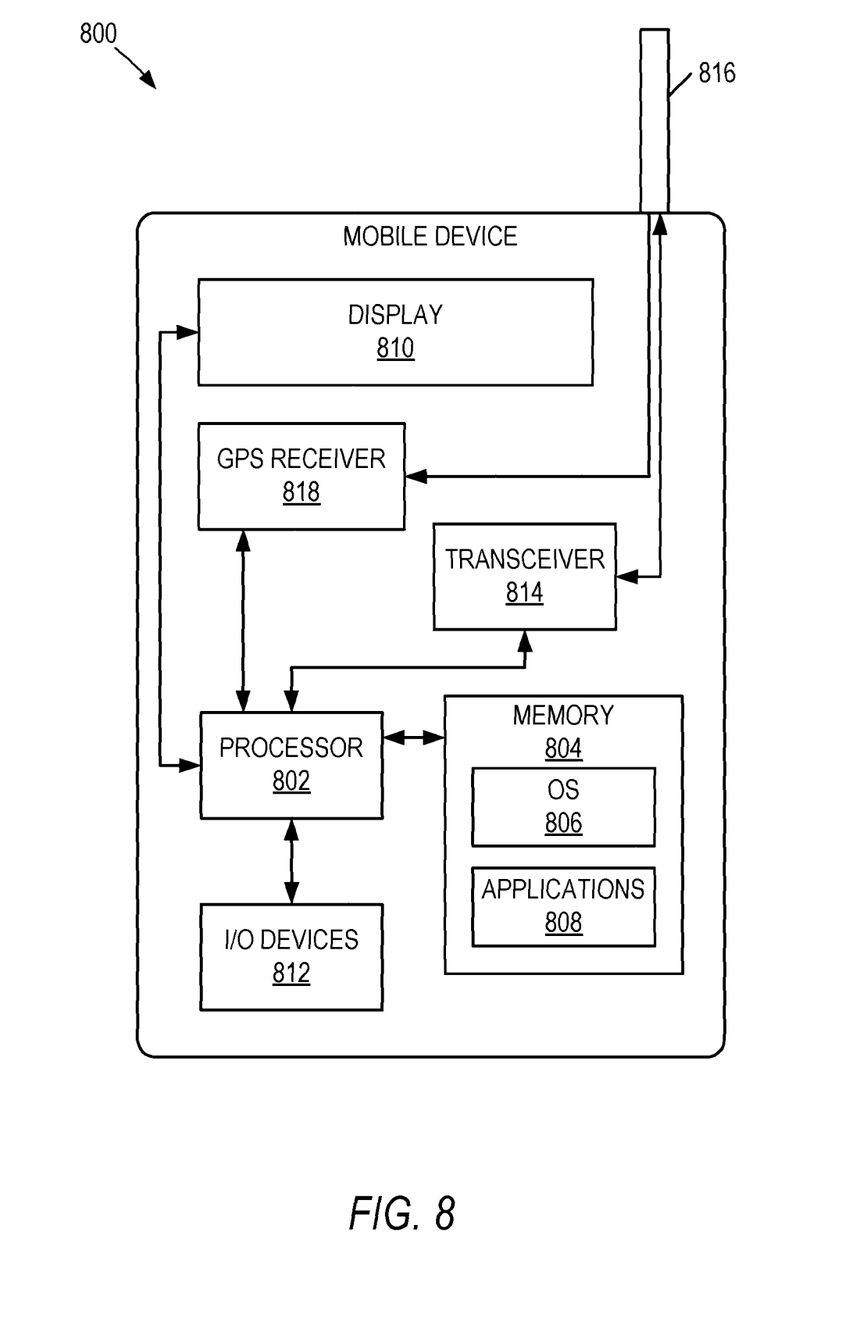
FIG. 8 is a block diagram illustrating a mobile device, according to some example embodiments.

FIG. 8 is a block diagram illustrating a mobile device 800, according to an example embodiment. The mobile device 800 may include a processor 802. The processor 802 may be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or other type of memory, is typically accessible to the processor 802. The memory 804 may be adapted to store an operating system (OS) 806, as well as application programs 808, such as a mobile location enabled application that may provide LBSs to a user. The processor 802 may be coupled, either directly or via appropriate intermediary hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
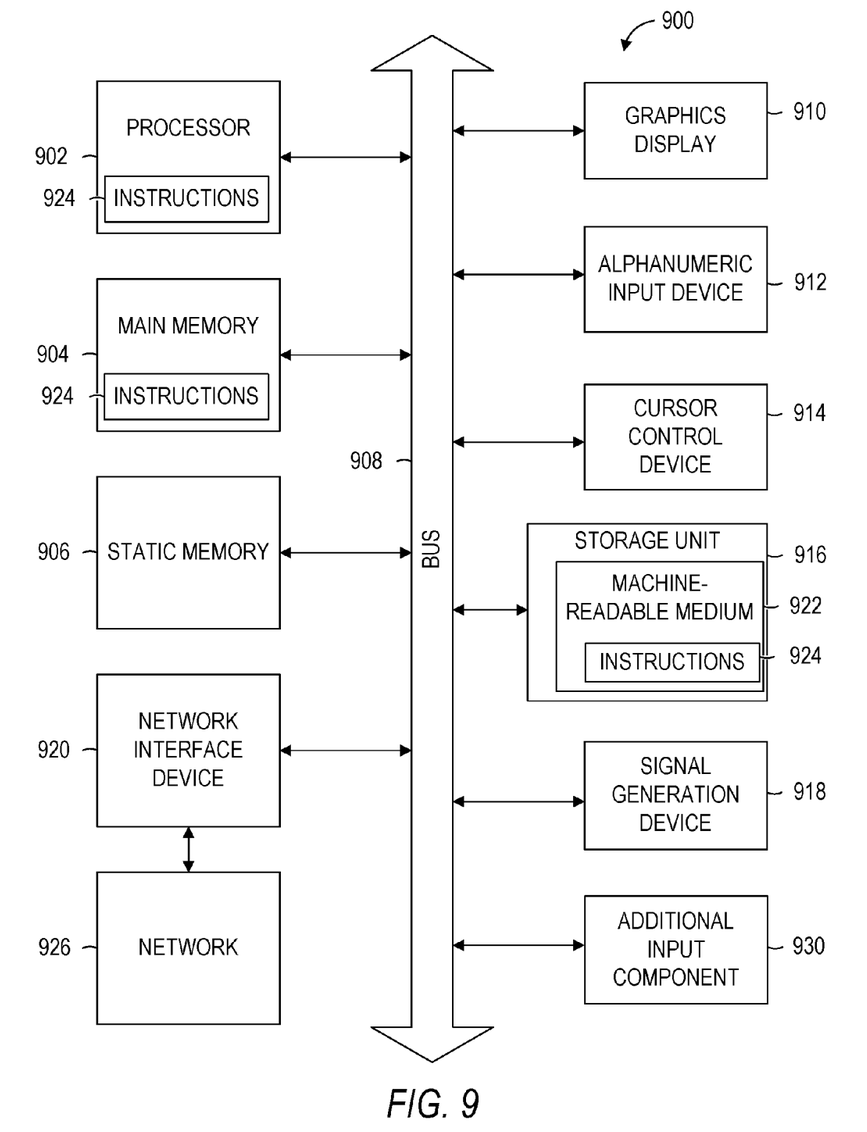
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media (e.g., tangible and non-transitory machine-readable media). The instructions 924 may be transmitted or received over the network 926 via the network interface device 920. For example, the network interface device 920 may communicate the instructions 924 using any one or more transfer protocols (e.g., hypertext transfer protocol (HTTP)).

In some example embodiments, the machine 900 may be a portable computing device, such as a smart phone or tablet computer, and have one or more additional input components 930 (e.g., sensors or gauges). Examples of such input components 930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
accessing an operational metric associated with a service running on a social networking service (SNS), the accessing being based on a detection of an anomaly pertaining to the running of the service;
generating, based on a log file that is associated with a software deployment on the SNS, a deployment time series of completion percentage values indicating levels of completion of the software deployment at one or more times in the time series;
determining, using one or more hardware processors, that a correlation exists between the operational metric and the deployment time series of completion percentage values;
generating a correlation strength identifier based on a determination of a strength of the correlation between the operational metric and the deployment time series of completion percentage values, the correlation strength identifier indicating a likelihood that the software deployment has caused the anomaly; and
causing a presentation of the correlation strength identifier in a user interface of a client device.

2. The method of claim 1, wherein the operational metric includes a metric time series of data points pertaining to the operational metric, and
wherein the determining that the correlation exists between the operational metric and the deployment time series of completion percentage values includes:
comparing the metric time series of data points pertaining to the operational metric and the deployment time series of completion percentage values indicating levels of completion of the software deployment, and
identifying the correlation between the metric time series of data points pertaining to the operational metric and the deployment time series of completion percentage values.

3. The method of claim 1, wherein the operational metric includes a metric time series of data points pertaining to the operational metric, the method further comprising:
generating a first graph pertaining to the operational metric based on the metric time series of data points pertaining to the operational metric; and
generating, based on the deployment time series of completion percentage values, a second graph pertaining to tracking a progress of the software deployment on the SNS,
wherein the determining that the correlation exists between the operational metric and the deployment time series of completion percentage values includes:
comparing the first graph and the second graph, and
identifying the correlation between the first graph and the second graph.

4. The method of claim 3, wherein the comparing of the first graph and the second graph includes overlaying the first graph and the second graph in the user interface of the client device, and
wherein the identifying of the correlation between the first graph and the second graph includes identifying, for a period of time pertaining to the running of the service, a similarity between a first pattern of the first graph and a second pattern of the second graph.

5. The method of claim 1, wherein the operational metric associated with the service measures errors that occur during the running of the service.

6. The method of claim 1, wherein the operational metric associated with the service measures latency pertaining to the running of the service.

7. The method of claim 1, wherein the service pertains to providing member profile data in response to one or more requests for member profile data.

8. The method of claim 1, further comprising:
detecting that the anomaly pertaining to the running of the service has occurred during a period of the running of the service.

9. The method of claim 1, further comprising:
determining that the software deployment has been performed during a period of time when the anomaly pertaining to the running of the service has occurred.

10. The method of claim 1, wherein the software deployment pertains to a software associated with the service.

11. A system comprising:
one or more hardware processors; and
a machine-readable medium for storing instructions that, when executed by the one or more hardware processors, cause the one or more hardware processors to perform operations comprising:
accessing an operational metric associated with a service running on a social networking service (SNS), the accessing being based on a detection of an anomaly pertaining to the running of the service;
generating, based on a log file that is associated with a software deployment on the SNS, a deployment time series of completion percentage values indicating levels of completion of the software deployment at one or more times in the time series;
determining that a correlation exists between the operational metric and the deployment time series of completion percentage values;
generating a correlation strength identifier based on a determination of a strength of the correlation between the operational metric and the deployment time series of completion percentage values, the correlation strength identifier indicating a likelihood that the software deployment has caused the anomaly; and
causing a presentation of the correlation strength identifier in a user interface of a client device.

12. The system of claim 11, wherein the operational metric includes a metric time series of data points pertaining to the operational metric, and
wherein the determining that the correlation exists between the operational metric and the deployment time series of completion percentage values includes:
comparing the metric time series of data points pertaining to the operational metric and the deployment time series of completion percentage values indicating levels of completion of the software deployment, and
identifying the correlation between the metric time series of data points pertaining to the operational metric and the deployment time series of completion percentage values.

13. The system of claim 11, wherein the operational metric includes a metric time series of data points pertaining to the operational metric, wherein the operations further comprise:
generating a first graph pertaining to the operational metric based on the metric time series of data points pertaining to the operational metric; and
generating, based on the deployment time series of completion percentage values, a second graph pertaining to tracking a progress of the software deployment on the SNS, and
wherein the determining that the correlation exists between the operational metric and the deployment time series of completion percentage values includes:
comparing the first graph and the second graph, and
identifying the correlation between the first graph and the second graph.

14. The system of claim 13, wherein the comparing of the first graph and the second graph includes overlaying the first graph and the second graph in the user interface of the client device, and
wherein the identifying of the correlation between the first graph and the second graph includes identifying, for a period of time pertaining to the running of the service, a similarity between a first pattern of the first graph and a second pattern of the second graph.

15. The system of claim 11, wherein the operational metric associated with the service measures errors that occur during the running of the service.

16. The system of claim 11, wherein the operational metric associated with the service measures latency pertaining to the running of the service.

17. The system of claim 11, wherein the service pertains to providing member profile data in response to one or more requests for member profile data.

18. The system of claim 11, further comprising:
detecting that the anomaly pertaining to the running of the service has occurred during a period of the running of the service.

19. The system of claim 11, further comprising:
determining that the software deployment has been performed during a period of time when the anomaly pertaining to the running of the service has occurred.

20. A non-transitory machine-readable storage medium comprising instructions that, when executed by one or more hardware processors of a machine, cause the one or more hardware processors to perform operations comprising:
accessing an operational metric associated with a service running on a social networking service (SNS), the accessing being based on a detection of an anomaly pertaining to the running of the service;
generating, based on a log file that is associated with a software deployment on the SNS, a deployment time series of completion percentage values indicating levels of completion of the software deployment at one or more times in the time series;
determining that a correlation exists between the operational metric and the deployment time series of completion percentage values;
generating a correlation strength identifier based on a determination of a strength of the correlation between the operational metric and the deployment time series of completion percentage values, the correlation strength identifier indicating a likelihood that the software deployment has caused the anomaly; and
causing a presentation of the correlation strength identifier in a user interface of a client device.

* * * * *

UNITED STATES PATENT AND TRADEMARK OFFICE
CERTIFICATE OF CORRECTION

PATENT NO. : 9,891,983 B1  
APPLICATION NO. : 15/223502  
DATED : February 13, 2018  
INVENTOR(S) : Anthony DeChiaro Page 1 of 1

It is certified that error appears in the above-identified patent and that said Letters Patent is hereby corrected as shown below:

On the Title Page

In item (22), in "Filed", in Column 1, Line 1, after "2016", insert --¶(65) Prior Publication Data US 2018/0032386 A1 Feb. 01, 2018--

Signed and Sealed this
Twenty-fifth Day of June, 2019

Andrei Iancu
*Director of the United States Patent and Trademark Office*